United States Patent [19]

Iwama et al.

[11] 4,385,084
[45] May 24, 1983

[54] PROCESS FOR PREPARING A SELECTIVE PERMEABLE MEMBRANE

[75] Inventors: Akio Iwama; Yoshiyasu Kamiyama; Yoshitaka Kazuse; Hisashi Ichinose, all of Osaka, Japan

[73] Assignee: Nitto Electric Industrial Co., Ltd., Ibaraki, Japan

[21] Appl. No.: 151,061

[22] Filed: May 19, 1980

[30] Foreign Application Priority Data

May 17, 1979 [JP] Japan .................. 54/61359

[51] Int. Cl.³ .............................................. B05D 5/00
[52] U.S. Cl. ...................................... 427/244; 264/41; 427/246; 521/64
[58] Field of Search ....................... 210/500.2; 264/41; 427/244, 246; 521/64

[56] References Cited

U.S. PATENT DOCUMENTS 3,615,024 10/1971 Michaels ............... 210/500.2 X
3,816,303 6/1974 Wrasidlo ............... 210/500.2 X
4,240,914 12/1980 Iwama et al. ............ 264/41 X Primary Examiner—Evan K. Lawrence
Attorney, Agent, or Firm—Sughrue, Mion, Zinn, Macpeak and Seas

[57] ABSTRACT

A process is described for preparing a selective permeable membrane comprising coating a solution consisting essentially of (i) a polyimide polymer consisting essentially of a repeating unit of the formula (I):

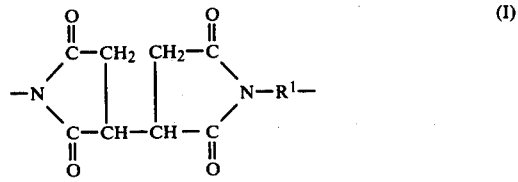

wherein $R^1$ is a divalent organic group, (ii) a swelling agent selected from the group of compounds represented by formula (II) and (III):

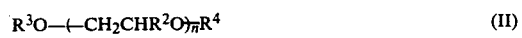

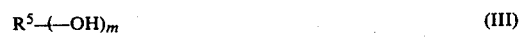

wherein $R^2$, $R^3$ and $R^4$, which may be the same or different, can be hydrogen, a methyl group, or an ethyl group, and when $R^2$ is hydrogen, n can be an integer of from 1 to 5, and when $R^2$ is a methyl or ethyl group, n can be an integer of from 1 to 3, $R^5$ is a saturated aliphatic hydrocarbon group containing 3 to 6 carbon atoms, and m can be an integer of from 2 to 6, and (iii) an organic solvent, on a supporting substrate, and immersing the solution coated supporting substrate in a coagulating liquid which does not dissolve the polyimide polymer and is miscible with the organic solvent, to coagulate the polyimide polymer and form the membrane. Membranes prepared by the process are also described.

28 Claims, No Drawings

PROCESS FOR PREPARING A SELECTIVE PERMEABLE MEMBRANE

BACKGROUND OF THE INVENTION

1. Field of the Invention

This invention relates to a process for preparing a selective permeable membrane. More particularly it relates to a process for preparing a selective permeable polyimide membrane which is suitable for use in separation of organic liquid mixtures as well as for aqueous liquid mixtures.

2. Description of the Prior Art

Membranes which can selectively permeate specific components in a solution or a liquid mixture such as an emulsion and a suspension are generally called "selective permeable membranes". The membrane-separation treatment utilizing such characteristics has hitherto been employed only for use with aqueous liquid mixtures. The reason for this is that permeable membranes made from celluloses such as cellophane, cellulose acetate, or cellulose nitrate generally have no resistance to organic solvents, and permeable membranes prepared from synthetic resins such as polyvinyl chloride, polypropylene and polystyrene are soluble in organic solvents, or at least swell therein if not soluble, and thus those membranes cannot be used for membrane-separation treatments.

However, membrane-separation treatments have been highly desired not only for aqueous liquid mixtures, but also for organic liquid mixtures, typically organic solutions, and development of such selective permeable membranes has been sought.

Fluoro resins, exemplified by polytetrafluoroethylene, are not always suitable for preparing such selective permeable membranes although they generally have excellent organic solvent resistance because the formation of such selective permeable membranes having fine pores is difficult to achieve, and the resins are very expensive.

Therefore, it has recently been proposed to produce selective permeable membranes using aromatic polyimides having organic solvent resistance. These aromatic polyimides have good organic solvent resistance as they are almost insoluble in organic solvents, but this causes problems in membrane formation, which is complicated and requires special techniques and many steps.

For example, Strathmann, Desalination, Vol. 26, p. 85 (1978) discloses a process for the production of aromatic polyimides which comprises reacting aromatic tetracarboxylic acid anhydride and aromatic diamine to obtain a polyamide acid soluble in organic solvents, flowcasting a solution of the polyamide acid on to a suitable support to provide a membrane structure, and then dehydrocyclizing the polyamide acid by chemical reaction or heat treatment. This process requires the additional procedure of converting the amide acid structure into the imide structure, and this procedure does not always proceed smoothly.

SUMMARY OF THE INVENTION

It is an object of this invention to provide a process for preparing a selective permeable membrane.

Another object of this invention is to provide a process for preparing a selective permeable membrane made from polyimides which are suitable for use in the membrane-separation treatment of organic liquid mixtures as well as for aqueous liquid mixtures.

The process for preparing a selective permeable membrane according to this invention comprises coating a solution consisting essentially of (i) a polyimide polymer consisting essentially of a repeating unit of the formula (I):

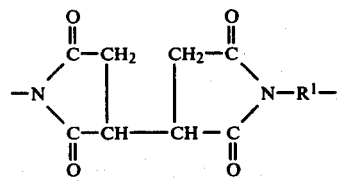

wherein $R^1$ is a divalent organic group, (ii) a swelling agent selected from the group consisting of compounds represented by formulae (II) and (III):

$$R^3O-(CH_2CHR^2O)_n-R^4 \qquad (II)$$

$$R^5-(OH)_m \qquad (III)$$

wherein $R^2$, $R^3$ and $R^4$, which may be the same or different, can be hydrogen, a methyl group, or an ethyl group, n can be an integer of 1 to 5, $R^5$ is a saturated aliphatic hydrocarbon group containing 3 to 6 carbon atoms, and m can be an integer of 2 to 6, and (iii) an organic solvent, on a supporting substrate and immersing the solution coated supporting substrate in a coagulating liquid which does not dissolve the polyimide polymer and is miscible with the organic solvent to coagulate the polyimide polymer and form the membrane.

DETAILED DESCRIPTION OF THE INVENTION

Polyimide polymers consisting essentially of a repeating unit of the formula (I) can be produced by dehydrocondensing 1,2,3,4-butanetetracarboxylic acid (hereinafter referred to as "BTC" for simplicity) and a diamine of the formula (IV):

$$H_2N-R^1-NH_2 \qquad (IV)$$

wherein $R^1$ is a divalent organic group as defined above. The reactants are used in substantially equimolar amounts, preferably in the presence of an organic solvent at about 100° to 300° C. for a period of from about 10 to 50 hours.

BTC imide-forming derivatives may be used in the invention instead of BTC, and as used hereinafter "BTC" is understood to refer to such derivatives also. Typical examples of such BTC imide-forming derivatives are BTC monoanhydride, BTC dianhydride, BTC lower alkyl esters such as BTC dimethyl ester, and BTC amide.

The diamine which is used in the preparation of the polyimide polymer is a compound of the formula $$H_2N-R^1-NH_2$$

wherein $R^1$ is a divalent organic group, such as a divalent aromatic group, a divalent group wherein at least two aromatic rings are linked by a divalent group, a divalent aliphatic group, a divalent group where at least two aliphatic groups are linked with a divalent group, a divalent alicyclic group, or a divalent group where at least two alicyclic groups are linked with a divalent group.

Examples of useful divalent aromatic groups include

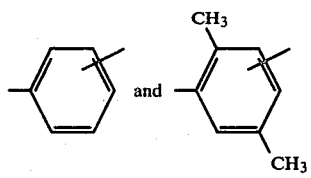

Examples of useful divalent group wherein at least two aromatic groups are linked by a divalent group include

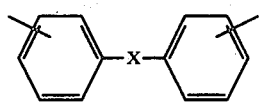

wherein X is —CH₂—,

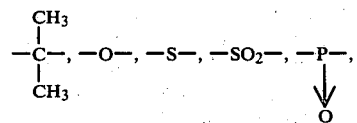

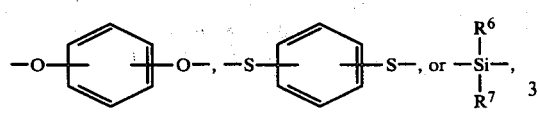

wherein $R^6$ and $R^7$, which may be the same or different, each represents a straight or branched alkyl group having from 1 to 2 carbon atoms or a cycloalkyl group having from 3 to 10 carbon atoms.

Examples of useful divalent aliphatic groups include

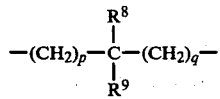

wherein $R^8$ is hydrogen, an alkyl group having from 1 to 3 carbon atoms or an alkoxy group having from 1 to 3 carbon atoms, $R^9$ is hydrogen atom or an alkyl group having from 1 to 4 carbon atoms, and p and q are integers of from 1 to 6; and

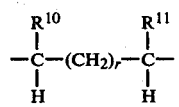

wherein $R^{10}$ is an alkyl group having from 1 to 3 carbon atoms, $R^{11}$ is hydrogen or an alkyl group having from 1 to 3 carbon atoms, and r is an integer of from 1 to 10.

Examples of divalent group wherein at least two aliphatic groups are linked with a divalent group include

—CH₂CH₂—Y—CH₂CH₂— wherein Y is —O— or —S—, and

wherein y is 0 or an integer of from 1 to 5 and z is an integer of from 1 to 3.

Suitable examples of useful divalent alicyclic groups include

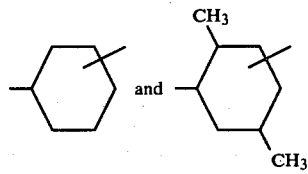

Examples of useful divalent group wherein at least two alicyclic groups are linked with a divalent group are

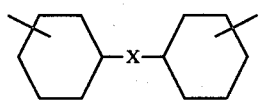

wherein X is defined as above.

Specific examples of useful diamines include meta-phenylenediamine, paraphenylenediamine, 4,4'-diaminodiphenyl-methane, 4,4'-diaminodiphenyl-propane, 4,4'-diaminodiphenyl ether, 3,4'-diaminodiphenyl ether, 4,4'-diaminodiphenyl sulfide, 4,4'-diaminodiphenyl sulfone, 3,3'-diaminodiphenyl sulfone, para-bis(4-aminophenoxy)benzene, meta-bis(4-aminophenoxy)benzene, metaxylylene diamine, paraxylylene diamine, di(para-amino-cyclohexyl) methane, hexamethylenediamine, heptamethylenediamine, octamethylenediamine, 1,4-diaminocyclohexane, bis-(4-aminophenyl)phosphine oxide, bis(4-aminophenyl)diethyl silane, bis(4-aminophenyl)dicyclohexyl silane, 4,4'-dimethylheptamethylenediamine, 3-methoxyheptamethylene diamine, 2,11-diaminododecane, and 4,4'-diaminodicyclohexyl ether; these diamines can be used individually or in admixtures thereof.

Diamines which can advantageously be used in this invention are those wherein the divalent organic group is an aromatic hydrocarbon group or two aromatic hydrocarbon groups are linked with a divalent group such as

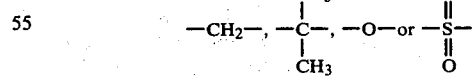

Also, mixtures of these diamines can be used.

The reaction of BTC and diamine is preferably carried out in a solvent. Typical solvents which can be used for this reaction are N-alkyl-2-pyrrolidone (such as N-methyl-2-pyrrolidone), dimethylacetoamide, N-alkyl-piperidone (such as N-methyl-2-piperidone), dimethylformamide, dihydroxybenzene, phenols (such as phenol and cresol), and so forth. Of these solvents, N-methyl-2-pyrrolidone, N-methyl-2-piperidone, or mixtures thereof are preferred, since they have high boiling points, permit reaction at high temperature, and are good solvents for BTC, diamine, and the resulting polyimide polymer.

In general, the amount of the solvent used is not particularly limited, and it is used in an amount sufficient to provide a uniform reaction, usually in an amount of about 60 to 900 parts by weight per 100 parts by weight of the total weight of BTC and diamine.

The polyimide polymer used in this invention preferably consists essentially of the repeating unit of the formula (I) and is obtained by reacting BTC and diamines at a temperature of from about 100° to 300° C.

If BTC and diamine are reacted at lower temperatures, for example, about 30° to 80° C., a polymer containing an amide acid bond which is a precursor of an imide ring, i.e., a polyimidepolyamide acid, is obtained. This polyimidepolyamide acid contains in addition to the repeating unit of the formula (I), for example, the following repeating units:

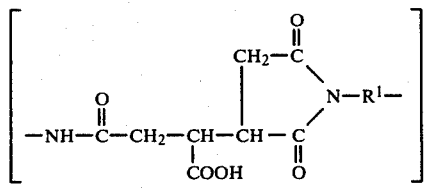

The polyimide polymer of this invention may contain an amide acid structure to a certain extent. The polyimide polymer should preferably have a percentage of imide units, calculated as:

$$\frac{\text{Number of Imide Rings}}{\text{Number of Imide Rings + Number of Amide Acid Bonds}}$$

of at least about 70% in this invention, and polyimide polymer having a percentage of imide units of at least about 90% or more are preferred and the polyimide polymer having the percentage of about 98 to 100% is particularly preferred. Thus, the polyimide polymer consisting essentially of the repeating unit of the formula (I) is preferred. If the percentage of imide units is less than about 70%, the permeable membrane produced has reduced organic solvent resistance.

The polyimide polymer used in this invention usually has an inherent viscosity (measured at 30° C. in N-methyl-2-pyrrolidone) of about 0.55 to 1.00, preferably about 0.60 to 0.85. If the inherent viscosity is too low, the polymer does not provide a selective permeable membrane having self-supporting property, i.e., membraneformation ability and it is therefore difficult to produce useful selectively permeable membranes from such polymers. On the other hand, if the inherent viscosity is too high, it is difficult to prepare a uniform solution (dope), and again it is difficult to produce a useful selective permeable membrane. Therefore, the number average molecular weight of the polyimide polymer used in this invention is usually from about 20,000 to 120,000 and preferably is from about 30,000 to 80,000.

According to the process of the invention, the selective permeable membrane is prepared in the following manner.

The polyimide polymer as described above and a swelling agent (as described in more detail hereinafter) are uniformly dissolved in an organic solvent to form a solution, and this solution is coated onto a suitable supporting substrate, as described below. Immediately or after evaporating a part of the organic solvent from the solution, the solution coated supporting substrate is brought into contact with a coagulating liquid to coagulate the polyimide polymer and form a membrane.

One type of swelling agent that can be used in the process of the invention is a glycol compound represented by the formula (II):

$$R^3O\text{-}(CH_2CHR^2O)_n\text{-}R^4 \tag{II}$$

wherein $R^2$, $R^3$ and $R^4$, which may be the same or different, can be hydrogen, a methyl group or a ethyl group. When $R^2$ is hydrogen, n is an integer of from 1 to 5, and is preferably from 1 to 3. When $R^2$ is a methyl or ethyl group, n is an integer of from 1 to 3, and preferably is 1 or 2. Examples of such a swelling agent include glycols, and mono- or di-methyl ethers thereof.

Examples of swelling agents according to formula (II) include: (poly)ethylene glycols, such as ethylene glycol, diethylene glycol and triethylene glycol; methyl or ethyl ether derivatives of the (poly)ethylene glycol such as ethylene glycol monomethyl ether, ethylene glycol monoethyl ether, ethylene glycol dimethyl ether, diethylene glycol monomethyl ether, diethylene glycol dimethyl ether and triethylene glycol monomethyl ether; a (poly)propylene glycol, such as propylene glycol or dipropylene glycol; methyl or ethyl ether derivatives of (poly)propylene glycol, such as propylene glycol monomethyl ether or propylene glycol monoethyl ether; and so forth.

Polyethylene glycol in which n is 6 or more and the methyl and ethyl ether derivatives thereof, and polypropylene glycol in which n is 4 or more and the methyl and ethyl ether derivatives thereof also, are less preferable because their solubilities in the dope are not always as high as is desirable, making it difficult in some cases to obtain a homogeneous solution.

Another type of swelling agent that can be used in the process of the invention is a polyhydric alcohol of formula (III):

$$R^5\text{-}(OH)_m \tag{III}$$

wherein $R^5$ and m are the same as defined above.

Examples of such swelling agents according to formula (III) include glycerine, 1,3-propanediol, 1,3-butanediol, 1,4-butanediol, 2,3-butanediol, 1,2,3,4-butanetetraol, xylitol, sorbitol, pentaerythritol, and so forth.

Polyhydric alcohols in which $R^5$ is a saturated aliphatic hydrocarbon group containing 7 or more carbon atoms are practically unsuitable, since they are generally only sparingly soluble in the solution, are not commercially available, and the preparation thereof is difficult.

The amount of swelling agent used is not critical, as long as it falls within the range such that the swelling agent dissolves in the organic solvent to yield a homogeneous solution. The amount generally is from about 30 to 300 parts by weight, and preferably is from about 50 to 200 parts by weight, per 100 parts by weight of the polyimide polymer.

The use of larger amounts of swelling agent tends to provide a non-homogeneous dope. On the other hand, if the amount of swelling agent used is too small, it tends to be difficult to obtain a permeable membrane having a sufficient solvent permeation rate.

In one embodiment swelling agent (preferably a glycol compound according to formula (II), a polyhydric alcohol according to formula (III), or mixtures thereof) is added in an appropriate amount to a homogenous solution, which has been prepared in advance by dissolving the polyimide polymer in the organic solvent, and is stirred at room temperature or while heating at a temperature of from about 80° to 150° C. to provide a homogeneous solution. In general, the glycol and polyhydric alcohol swelling agents have advantages in that the solutions prepared using them are stable as compared with solutions containing inorganic salt swelling agents as described, for example, in U.S. patent application Ser. No. 961,168 filed Nov. 16, 1978 now U.S. Pat. No. 4,240,914 Iwama et al. Examples of the inorganic salt swelling agent include halides (such as chlorides or bromides), nitrates or sulfates of alkali metal or alkaline earth metal (such as lithium, potassium, sodium or magnesium), or mixtures thereof.

In the process of this invention, mixtures comprising two or more of the glycol and polyhydric alcohol swelling agents can be used, and are preferred. The glycol swelling agent and the polyhydric alcohol swelling agent in the mixture can be used in any proportions. The mixture is used in an amount of from about 30 to 300 parts by weight per 100 parts by weight of the polyimide polymer. Also, a mixture of the inorganic salt swelling agent and the glycol or polyhydric alcohol swelling agent can be used within the range of 30 to 300 parts by weight per 100 parts by weight of the polyimide polymer, but the amount of the inorganic salt swelling agent added is limited to no more than about 200 parts by weight, and preferably is no more than 100 parts by weight, per 100 parts by weight of the polyimide polymer.

The organic solvent for use in forming a homogeneous solution by dissolving the polyimide polymer and the swelling agent therein (as described above) must be miscible with a coagulating solvent, usually water. Examples of such organic solvent include N-alkyl-2-pyrrolidones, such as N-methyl-2-pyyrolidone or N-ethyl-2-pyrrolidone, N-alkyl-2-piperidones, such as N-methyl-2-piperidone, dimethylformaldehyde, dimethylacetamide, dimethylsulfoxide, tetramethyl urea, sulfolane, and mixtures thereof. Usually the solvent for use in the reaction of BTC and diamine is employed as the organic solvent. After completion of the reaction between BTC and diamine, the reaction product is, if necessary, diluted or condensed and then a swelling agent is added thereto to provide a solution.

The concentration of the solution (i.e., the percentage by weight of the polyimide polymer or solids content, based on the total weight of the solution) is usually about 5 to 30% by weight, and preferably from 10 to 25%. If the solution concentration is extremely low, the permeable membrane obtained will have poor selectivity, whereas if the solution concentration is extremely high, the viscosity of the solution will be so high that uniform coating of the solution on the supporting substrate becomes difficult to provide, and the solvent permeation rate of the permeable membrane obtained will be decreased, which reduces the practical value of the permeable membrane. The viscosity of the solution is generally controlled such that the viscosity when coating on the supporting substrate is from about 50 to 5,000 poises, and preferably is from about 100 to 2,000 poises.

The coagulating liquid which is used for coagulating the solution coated on the supporting substrate to provide a membrane structure is a solvent which is miscible with the organic solvent, preferably in any proportions, and furthermore is capable of dissolving the swelling agent. A typical example of the coagulating liquid is water. Other coagulating liquids that can be used in the invention include mixed solvents of water and organic solvents miscible with water. Representative examples of such organic solvents are acetone, lower aliphatic alcohols such as methanol, ethanol or propanol, glycols such as ethylene glycol, diethylene glycol or diethylene glycolmonomethyl ether, and derivatives thereof. The amount of the organic solvent in the mixed solvent is usually about 10% by weight or less. If desired, however, these organic solvents can used alone as the coagulating liquid.

The formation of the membrane can be carried out by conventional procedures. For example, the solution with the polyimide polymer and the swelling agent dissolved therein is coated on the suitable supporting substrate, usually at room temperature ranging between about 10° C. and 40° C., and then the solution coated supporting substrate is immersed in the coagulating liquid, whereby the organic solvent is substantially replaced by the coagulating liquid, and, at the same time the polyimide polymer is coagulated to form a membrane.

The nature of the supporting substrate is not particularly limited. When plates and pipes having smooth surfaces which are made of, for example, glass, stainless steel, aluminum, polyethylene and polypropylene are used as a supporting substrate, after the coagulation of the polyimide polymer in the coagulating liquid, the membranes formed on the plate and pipe can easily be stripped off to obtain sheet-like or tubular permeable membranes. In addition, woven or unwoven sheet-like or tubular supporting substrates made of organic fibers, such as polyester fiber or acryl fiber and inorganic fibers, such as glass fiber or carbon fiber, can be used. Coating the solution on the woven or unwoven sheet-like or tubular supporting substrate by conventional procedures such as roll coating, spray coating, dip coating, and casting bob coating can be used to obtain a composite permeable membrane having high strength in which the polyimide polymer is combined with the supporting substrate.

When the viscosity of the solution is high, it is preferred to coat the solution on the substrate by a method as described in Japanese patent application (OPI) No. 86078/1976, or by a mechanical extrusion coating method.

The thickness of the solution with which the supporting substrate is coated varies depending upon the purpose for use of the permeable membrane and the type of the support, but is usually controlled such that the permeable membrane formed has a thickness of from about 50 to 400μ, preferably about 100 to 300μ. If the membrane thickness is too thin, the permeable membrane obtained has poor strength in practical use. If the membrane thickness is too thick, the selective permeability of the permeable membrane increases, but the solvent permeation rate is reduced, resulting in reduction in the practical value of the permeable membrane.

The thickness of the permeable membrane obtained depends on the concentration of the solution coated on the supporting substrate. For a given thickness of the solution coating, the thickness of the permeable membrane obtained increases with increasing concentration of the solution. When the supporting substrate has a smooth surface like a glass plate, and the thickness of the solution coated is, for example, about 300μ, use of solution concentration of about 20% provides a membrane having a thickness of about 170μ, and use of a solution concentration of about 15% provides a membrane having a thickness of about 150μ.

The solution coated on the supporting substrate is immediately, or within a short time, for example, 30 minutes, brought in contact with a coagulating liquid. If after coating the substrate is allowed to stand for a long period of time, a white turbidity appears on the surface of the solution and the transparency of the solution is lost. The permeable membrane prepared from such a white turbid solution is not desirable, in that the membrane has nonuniform characteristics over the surface thereof, and the selctive permeability decreases.

The permeable membrane obtained by the process of this invention is a so-called anisotropic membrane, with a skin layer on the surface thereof, in which the skin layer has a fine structure and is totally supported by a porous layer below, and can suitably be used as an ultrafiteration membrane. The use of the glycol and polyhydric alcohol swelling agents as described herein provides membranes particularly suitable for use as ultrafilteration membranes.

In the process of this invention, in order to decrease the pore diameter of the permeable membrane obtained, and thereby increase the selectivity, the solution can be coated on the support, subjected to a heat-treatment to further evaporate forcedly a part of the organic solvent and then immersed in the coagulating liquid. The evaporation treatment of the organic solvent by such a heat-treatment can usually be carried out by blowing hot air at a temperature of from about 50° to 200° C. onto the surface of the solution coated for, for example, from about 1 to 120 seconds. This heat-treatment allows the formation of a thin flm layer having a high solution concentration on the surface of the solution coated on the support, and when the thus treated solution is immersed in the coagulating liquid a skin layer having much smaller pore diameters can be obtained. Since the concentration of the solution at the side of the substrate is relatively low, when immersed in the coagulating solvent, a porous layer is formed. This evaporation treatment of the organic solvent is advantageous for the production of reverse osmosis membranes and in some cases, is also advantageous for the production of ultrafilteration membranes.

The temperature at which the solution coated on the support is immersed in the coagulating liquid to form a membrane is not particularly limited and is generally below the boiling point of the coagulating liquid. Where water is used as the coagulatinng liquid, the temperature is usually in the range of from about 0° to 80° C., and preferably is from 0° to 50° C.

The time required to coagulate and form the membrane depends upon the temperature at which the coagulation and membrane formation is carried out, but is usually from about 1 to 10 hours.

The permeable membrane thus formed in the coagulating liquid can be stored in the coagulating liquid as it is; that is, the membrane formation and storage of the membrane can be effected in the single step using the same liquid. The permeable membrane can be stored in organic solvents. Where the permeable membrane is produced using water as the coagulating liquid, the water present in the permeable membrane can be replaced by an organic solvent which is miscible with water, such as acetone and methanol, and the membrane can be immersed and stored in a suitable organic solvent, such as an aromatic hydrocarbon solvent.

As another embodiment of this invention, hollow fiber type permeable membranes can be produced by extruding the solvent into the coagulating solvent through hollow spinning nozzles.

Furthermore, for the purposes of improving the mechanical strength and the like of the permeable membrane obtained, other polymers which are miscible with the solution and having self-supporting properties, such as polysulfone (e.g., P-1700, P-3500, etc. produced by Union Carbide Co.) or polyphenylene oxide (e.g., PPO-534, etc. produced by General Electric Co.) can be dissolved together with the polyimide polymer in the organic solvent to form the membrane.

The polysulfone and polyphenylene oxide have poor organic solvent resistance as compared to the polyimide polymer used in this invention, and therefore the membrances produced from solution containing such polymers have reduced organic solvent resistance. These permeable membranes, however, can be used for the membrane-separation treatment of aqueous liquid mixtures without any problem. Even in the case of organic liquid mixtures, the membranes can fully practically be used depending upon the kind of the organic solvent contained therein.

The amount of the polymers other than the polyimide polymer should be limited to no more than about 20 parts by weight, and preferably to no more than 5 parts by weight, per 100 parts by weight of these polyimide polymer which constitutes the solution. Addition of the polymers in amounts exceeding 20 parts by weight does not provide a homogeneous solution. For such solutions containing other polymers in addition to the polyimide polymer, the same conditions for solution concentration, viscosity, amount of swelling agent, etc. as previously described are preferably employed.

Furthermore, for the purposes of improving the mechanical strength and the like of the permeable membrane at high temperatures, the permeable membrane formed can be heat-treated at temperatures of from about 100° to 400° C. for from about 5 to 30 minutes. This heat-treatment can be effected by blowing hot air or by immersing in hot water or heated ethylene glycol. The treatment time can be shortened as the treatment temperature becomes higher, and when the treatment temperature is lowered, the treatment time is lengthened. For example, when the treatment temperature is 100° C., the treatment time desirably is from about 20 to 25 minutes, and when the treatment temperature is 350° C., the treatment time is from several seconds to several tens of seconds.

Thus according to the process of this invention, the polyimide polymer obtained from BTC and diamine is employed as a membrane-forming material, and the membrane is formed using the swelling agent as described above, after the polyimide polymer has been dissolved in the organic solvent to obtain a homogeneous solution. After the membrane formation, this invention does not require any additional steps, which further distinguishes from conventional processes for forming aromatic polyimide membranes, in which the step of converting polyamide acid into the corresponding imide is required after the formation of a polyamide acid membrane. Thus this invention is extremely advantageous from an industrial standpoint.

The membrane obtained according to the process of this invention is, as clearly indicated in the examples described hereinafter, excellent in its properties, particularly in organic solvent resistance, and it also has high solvent permeation rates and excellent selective permeability. Therefore, this membrane is suitable for the ultrafilteration of organic liquid mixtures and the like, and can advantageously be employed for the disposal of organics-containing waste water from factories and for condensation and purification steps in the field of foods, medicines, fermentation, brewing, and so forth.

For example, the membrane obtained according to the process of this invention is suitable for use in separation of organic liquid mixtures containing organic solvents such as: an aromatic solvent, such as benzene, xylene or nitrobenzene; an ether solvent such as ethyl ether, tetrahydrofuran, or dioxane; a ketone solvent, such as acetone or methyl ethyl ketone; a monohydric alcohol solvent, such as methanol, ethanol, propanol or butanol; a polyhydric alcohol, such as ethylene glycol, diethylene glycol or 1,3-butylene glycol; a polyhydric alcohol ether solvent, such as methyl cellosolve, ethyl cellosolve, diethylene glycol monomethyl ether, ethylene glycol dimethyl ether or diethylene glycol dimethyl ether; an ester solvent, such as ethyl acetate, butyl acetate, ethyl propionate, mono- or diacetic acid esters of ethylene glycol, or mono- or diacetic acid esters of diethylene glycol; and a halognated hydrocarbon solvent such as dichloromethane, 1,2-dichloroethane, trichloroethylene chloroform, bromoform or chlorobenzene.

The selective permeable membrane obtained according to the process of this invention can also suitably be used for the membrane-separation treatment of aqueous liquid mixtures.

This invention will now be explained in detail by reference to the following examples, but is not limited thereto. Unless otherwise indicated, all parts, percentages, ratios and the like are by weight.

In the Examples, the following equations are used to calculate the degree of removal and the permeation rate, which are commonly used to evaluate the characteristics of a selective permeable membrane.

Membrane Formation and Evaluation of Membrane Characteristics:

A toluene solution containing polystrene having an average molecular weight of 100,000 in a concentration of 10,000 ppm was used as a feed solution, and the degree of removal and the permeation rate as defined below were measured to evaluate the membrane characteristics.

Degree of Removal:

$$1 - \frac{\text{Polystyrene Concentration in Permeate}}{\text{Polystyrene Concentration in Feed Solution}} \times 100(\%)$$

Permeation Rate:

$$\frac{\text{Volume of Toluene Permeated (m}^3\text{)}}{\text{Effective Membrane Area (m}^2\text{)} \times \text{Permeation Time (days)}}$$

PREPARATIVE EXAMPLE 1

Preparation of Polyimide Polymer

A mixture of 14.8 Kg of N-methyl-2-pyrrolidone (hereinafter referred to as "NMP"), 2.81 Kg of 1,2,3,4-butanetetracarboxylic acid (BTC) and 2.40 Kg of 4,4-diamino diphenyl ether was charged into a 20 liter reaction vessel equipped with a stirrer, a nitrogen gas inlet, a reflux column equipped with an appratus for withdrawal of water formed during the reaction, and a jacket bath heatable up to 250° C., and the mixture was heated up to about 70° C. to obtain a uniform solution.

After adding 1.7 Kg of xylene as an azeotropic solution for dehydration to the uniform solution, the resulting mixture was heated under a nitrogen stream at a temperature of from 175° to 195° C. and the reaction formation water distilled away by azeotrope was continuously withdrawn (distilled away as an azeotrope) while refluxing the xylene.

The viscosity of the reaction system increased as the reaction proceeded, until after about 35 hours, 860 g of water had been distilled away. After completion the reaction, the xylene was distilled out of the reaction system to obtain an NMP solution of a polyimide polymer having a solids content of 25% and a viscosity of 180 poises (measured with a B-type viscometer at 30° C.). The inherent viscosity [$\eta$] of the polyimide polymer was 0.76 at 30° C.

Nuclear magnetic resonance spectrum and infrared spectrum analysis confirmed that the degree of conversion to imide in the polyimide polymer was at least 99% or more.

PREPARATIVE EXAMPLE 2

Preparation of Polyimide Polymer

A NMP solution of a polyimide polymer having a solids content of 18% and a viscosity of 57 poises (measured with a B-type viscometer at 30° C.) was obtained using a mixture of 1.50 Kg of BTC, 1.27 Kg of diaminodiphenylmethane and 12.8 Kg of NMP in the same manner as in Preparation Example 1.

The inherent viscosity [$\eta$] of the polyimide polymer was 0.58 at 30° C. Nuclear magnetic resonance spectrum and infrared spectrum analysis confirmed that the degree of conversion to imide in the polyimide polymer was at least 99%.

PREPARATIVE EXAMPLE 3

Production of Dopes (1) To the polyimide polymer solution obtained in Preparative Example 1 was added 150 parts, based on 100 parts of the polyimide polymer of diethylene glycol, and the resulting mixture was stirred at 100° C. for 3 hours to obtain homogeneous Solution A.

(2) To the polyimide polymer solution obtained in Preparation Example 2 was added 80 parts, based on 100 parts of the polyimide polymer, of triethylene glycol, and the resulting mixture was stirred at 100° C. for 5 hours to obtain homogeneous Solution B.

(3) Solutions C, D, E and F were prepared in the same manner as in (1) above, except that the organic swelling agents as shown in Table 1 were used.

The kind of swelling agent and the amount thereof in each solution are shown in Table 1.

TABLE 1

| Solution | Polyimide Polymer Used | Swelling Agent | Amount of Swelling Agent Added(*) |
|---|---|---|---|
| A | Preparation Example 1 | Diethylene Glycol | 150 |
| B | Preparation Example 2 | Triethylene Glycol | 80 |
| C | Preparation Example 1 | Diethylene Glycol Monomethyl Ether | 100 |
| D | Preparation Example 1 | 1,3-Butanediol | 200 |
| E | Preparation Example 1 | Glycerol | 120 |
| F | Preparation Example 1 | Pentaerythritol | 100 |

(*)Based on 100 parts of polyimide polymer.

EXAMPLE 1

Solution A was coated on a glass plate at a thickness of 360μ, held horizontally at a temperature of 25° C. for about 10 seconds, and then immersed in water at 0° C. for 5 hours, to provide a permeable membrane having a thickness of 235μ. This permeable membrane was immersed in methanol for 24 hours to remove the water present therein and then stored in toluene.

The permeable membrane was taken out of the toluene and placed on a pressure batch type measuring cell. By introducing the toluene solution of the polystyrene into the cell under the conditions of 25° C. and 10 Kg/cm², the degree of removal and the permeation rate of toluene were measured. The results are shown in Table 2.

EXAMPLE 2

Solution A was coated on the inner surface of a glass tube having an inner diameter of 13.6 mm and a thickness of 3 mm in a thickness of 400μ, and then immediately immersed in water at 5° C. for 5 hours to provide a tubular permeable membrane having a thickness of 252μ. This permeable membrane was immersed in methanol for 24 hours to remove the water present therein, and was then stored in toluene.

The thus obtained permeable membrane was inserted into a bored stainless steel pipe having an inner diameter of 13.3 mm. By introducing the polystyrene solution into the pipe under the conditions of 25° C. and 10 Kg/cm², the degree of removal and the permeation rate were measured. The results are shown in Table 2.

EXAMPLE 3

Solution C was coated on a glass plate in a thickness of 360μ and immediately heated in an air circulation type heating oven at a temperature of 130° C. for 30 seconds. After taken out of the oven, the glass plate was immediately immersed in water at 0° C. for 5 hours to provide a permeable membrane having a thickness of 187μ. This permeable membrane was immersed in methanol for 24 hours to remove the water present therein, and was then immersed in toluene.

The degree of removal and the permeation rate of the permeable membrane were measured as in Example 1. The results are shown in Table 2.

EXAMPLE 4

Solution B was coated onto the inner surface of a glass tube having an inner diameter of 13.6 mm and a thickness of 3 mm in a thickness of 400μ. Immediately the glass tube was immersed in water at 5° C. for 5 hours to obtain a tubular permeable membrane having an outer diameter of 13.3 mm and a thickness of 226μ. The tubular permeable membrane was immersed in methanol for 24 hours to remove the water present therein, and was then stored in toluene.

The degree of removal and the permeation rate of toluene were measured in the same manner as in Example 1. The results are shown in Table 2.

EXAMPLE 5

The same procedure as in Example 3 was followed except that Solution B was used instead of Solution C. The results are shown in Table 2.

EXAMPLE 6

The same procedure as in Example 1 was followed except that Solution C was used instead of Solution A. The results are shown in Table 2.

EXAMPLE 7

The same procedure as in Example 1 was followed except that Solution D was used instead of Solution A. The results are shown in Table 2.

EXAMPLE 8

The same procedure as in Example 3 was followed except that Solution E was used instead of Solution C. The results are shown in Table 2.

EXAMPLE 9

The same procedure as in Example 3 was followed except that Solution F was used instead of Solution C. The results are shown in Table 2.

EXAMPLE 10

The same procedure as in Example 3 was followed except that Solution G was used instead of Solution C. The results are shown in Table 2.

TABLE 2

| Example | Solution | Swelling Agent | Film Thickness | Permeation Rate | Degree of Removal |
|---|---|---|---|---|---|
| 1 | A | Diethylene Glycol | 235 | 1.81 | 94.6 |
| 2 | A | Diethylene Glycol | 252 | 2.05 | 94.1 |
| 3 | C | Diethylene Glycol Monomethyl Ether | 187 | 0.94 | 99.3 |
| 4 | B | Triethylene Glycol | 226 | 1.98 | 96.5 |
| 5 | B | Triethylene Glycol | 160 | 1.15 | 97.7 |
| 6 | C | Diethylene Glycol Monomethyl Ether | 221 | 1.65 | 97.5 |
| 7 | D | 1,3-Butanediol | 252 | 1.87 | 91.3 |
| 8 | E | Glycerol | 189 | 1.17 | 97.9 |
| 9 | A | Diethylene Glycol | 178 | 1.22 | 98.4 |
| 10 | F | Pentaerythritol | 223 | 1.26 | 95.1 |

EXAMPLE 11

Evaluation of Organic Solvent Resistance

The permeable membrane having a thickness of 235μ obtained in Example 1 was immersed in various solvent shown in Table 3 below at a temperature of 25° C. for a period of 48 hours. Thereafter, the degree of removal and the permeation rate of the membrane were measured in the same manner as in Example 1. The results obtained are shown in Table 3 below.

TABLE 3

| Organic Solvent | Degree of Removal (%) | Permeation Rate (m³/m² day) |
|---|---|---|
| Ethanol | 97.1 | 2.06 |
| Ethyl Acetate | 95.3 | 1.75 |
| Methyl Ethyl Ketone | 94.9 | 1.92 |
| n-Hexane | 97.6 | 1.73 |
| Xylene | 95.4 | 1.79 |
| Trichloroethylene | 98.3 | 1.55 |
| Methyl Cellosolve | 98.1 | 1.56 |
| Dioxane | 94.3 | 1.83 |

While the invention has been described in detail and with reference to specific embodiments thereof, it will be apparent to one skilled in the art that various changes and modifications can be made therein without departing from the spirit and scope thereof.

What is claimed is:

1. A process for preparing a selective permeable membrane which is suitable for use in the separation of organic liquid mixtures comprising coating a solution consisting essentially of
   (i) a polyimide polymer consisting essentially of a repeating unit of the formula (I):

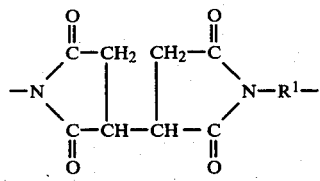

wherein $R^1$ is a divalent organic group,
   (ii) at least one swelling agent selected from the group of compounds represented by formulae (II) and (III)

$$R^3O-(-CH_2CHR^2O)_n-R^4 \quad (II)$$
   $$R^5-(-OH)_m \quad (III)$$

wherein $R^2$, $R^3$ and $R^4$, which may be the same or different, can be hydrogen, a methyl group, or an ethyl group, and when $R^2$ is hydrogen, n can be an integer of from 1 to 5, and when $R^2$ is a methyl or ethyl group, n can be an integer of from 1 to 3, $R^5$ is a saturated aliphatic hydrocarbon group containing 3 to 6 carbon atoms, and m can be an integer of from 2 to 6, and
   (iii) an organic solvent, on a supporting substrate, and immersing the solution coated supporting substrate in a coagulating liquid which does not dissolve the polyimide polymer and is miscible with the organic solvent, to coagulate the polyimide polymer and form the membrane.

2. A process as in claim 1, wherein said polyimide polymer has a percentage of imide units of at least about 70%.

3. A process as in claim 1, wherein said polyimide polymer has a percentage of imide units of at least 90%.

4. A process as in claim 1, wherein said polyimide polymer has a percentage of imide units of from 98 to 100%.

5. A process as in claim 1, wherein $R^1$ in the formula (I) is a divalent organic group containing at least one aromatic ring.

6. A process as in claim 1, wherein said polyimide polymer has a inherent viscosity of from about 0.55 to 1.00.

7. A process as in claim 1, wherein said polyimide polymer has a inherent viscosity of from 0.60 to 0.85.

8. A process as in claim 1, wherein a swelling agent represented by formula (II) is selected wherein $R^2$ is hydrogen and n is an integer of from 1 to 5.

9. A process as in claim 1, wherein a swelling agent represented by formula (II) is selected wherein $R^2$ is hydrogen and n is an integer of from 1 to 3.

10. A process as in claim 1, wherein a swelling agent represented by formula (II) is selected wherein $R^2$ is a methyl or ethyl group, and n is an integer of from 1 to 3.

11. A process as in claim 10, wherein n is 1 or 2.

12. A process as in claim 1, 8, 9, 10, or 11, wherein a swelling agent represented by formula (II) is selected from the group consisting of diethylene glycol, triethylene glycol, propylene glycol, dipropylene glycol, diethylene glycol monomethyl ether, triethylene glycol monoethyl ether, propylene glycol monomethyl ether, dipropylene glycol monomethyl ether, and mixtures thereof.

13. A process as in claim 1, wherein a swelling agent represented by formula (III) is selected.

14. A process as in claim 1 or 13, wherein a swelling agent represented by formula (III) is selected from the group consisting of glycerin, propanediol, butanediol, butanetetraol, pentaerythritol, xylitol, sortitol and mixtures thereof.

15. A process as in claim 1, 2, 3, 4, 6 or 7 wherein said organic solvent is selected from the group consisting of N-methylpyrrolidone and dimethylformamide.

16. A process as in claim 11 wherein said coagulating medium is water.

17. A process as in claim 1, 2, 3, 4, 5, 6, or 7 wherein the coating solution has a concentration of from about 5 to 30% by weight of the polyimide polymer based on the total weight of the solution.

18. A process as in claim 17 wherein the coating solution has a concentration of from 8 to 20% by weight.

19. A process as in claim 1, 2, 3, 4, 5, 6, or 7 wherein said swelling agent is present in said coating solution in an amount from about 30 to 300 parts by weight per 100 parts by weight of the polyimide polymer.

20. A process as in claim 5 wherein said $R^1$ is selected from the group consisting of

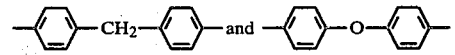

21. A process as in claim 1, 2, 3, 4, 5, 6, or 7, wherein prior to immersing the solution coated supporting substrate in the coagulating liquid, the coated substrate is heated by hot air at a temperature of from about 50° C. to 200° C. for a period of time from about 1 to 120 seconds.

22. A process as in claim 1, 2, 3, 4, 5, 6, or 7, wherein said solution contains other polymers which are miscible with the solution and have self-supporting properties, in an amount of no more than about 20 parts by weight per 100 parts by weight of the polyimide polymer.

23. A process as in claim 22, wherein said solution contains other polymers which are miscible with the solution and have self-supporting properties, in an amount no more than 5 parts by weight.

24. A process as in claim 22, wherein said other polymers are selected from the group consisting of polysulfone and polyphenylene oxide polymers.

25. A process as in claim 1, 2, 3, 4, 5, 6, or 7, wherein said other polymers are selected from the group consisting of polysulfone and polyphenylene oxide polymers.

26. A process as in claim 1, 2, 3, 4, 5, 6, or 7, wherein after said coagulation step the membrane is heat-treated at a temperature of from about 100° to 400° C. for from about 5 to 30 minutes.

27. A process as in claim 1, 2, 3, 4, 5, 6, or 7, wherein the number average molecular weight of the polyimide polymer is from about 20,000 to 120,000.

28. A process as in claim 27 wherein the molecular weight is from about 30,000 to 80,000.

* * * * *